Jan. 4, 1966

J. E. RAIDEL 3,227,468

TANDEM SUSPENSIONS

Filed Nov. 1, 1963

Inventor
John E. Raidel
By Wallace, Kinzer and Dorn
Attorneys

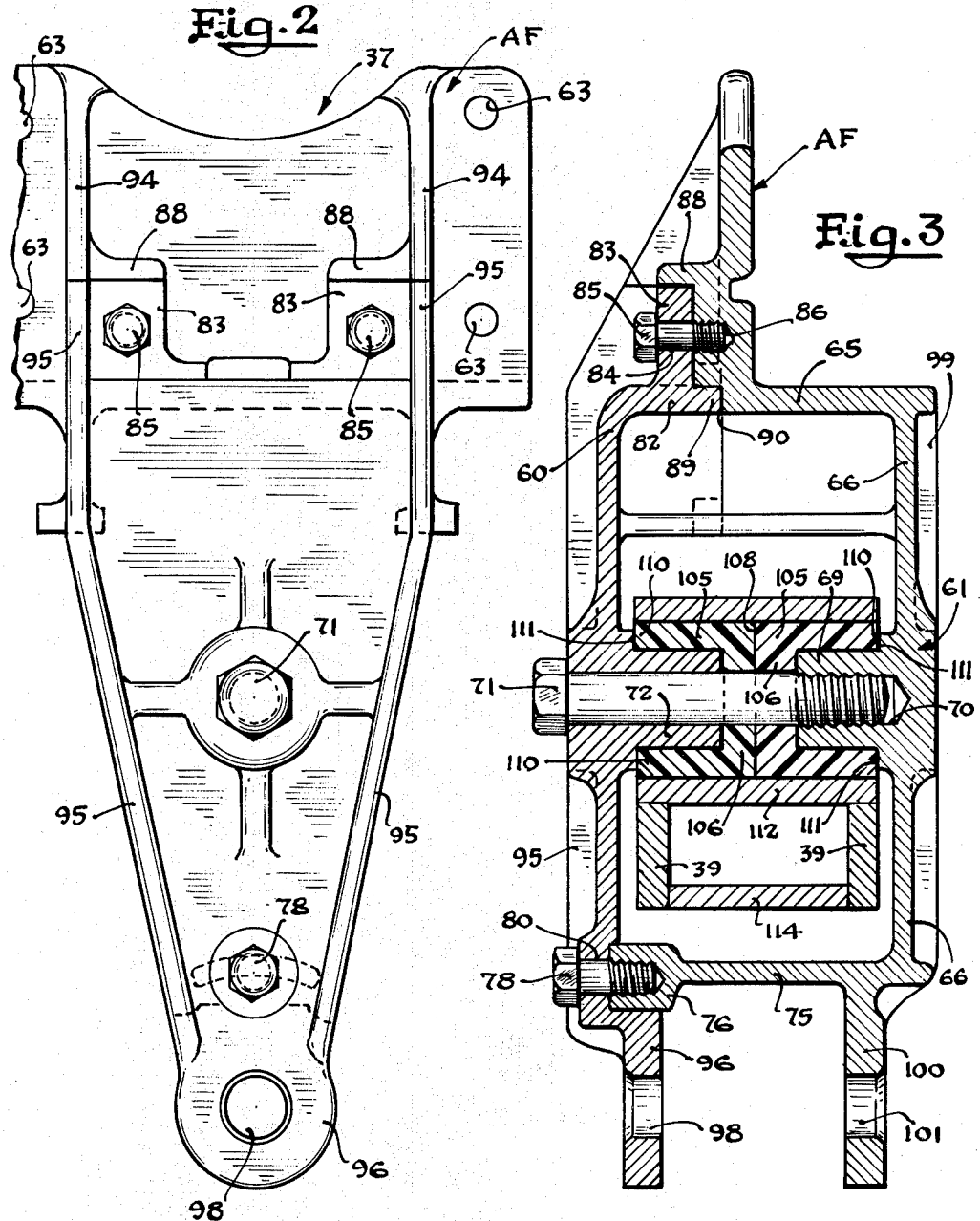

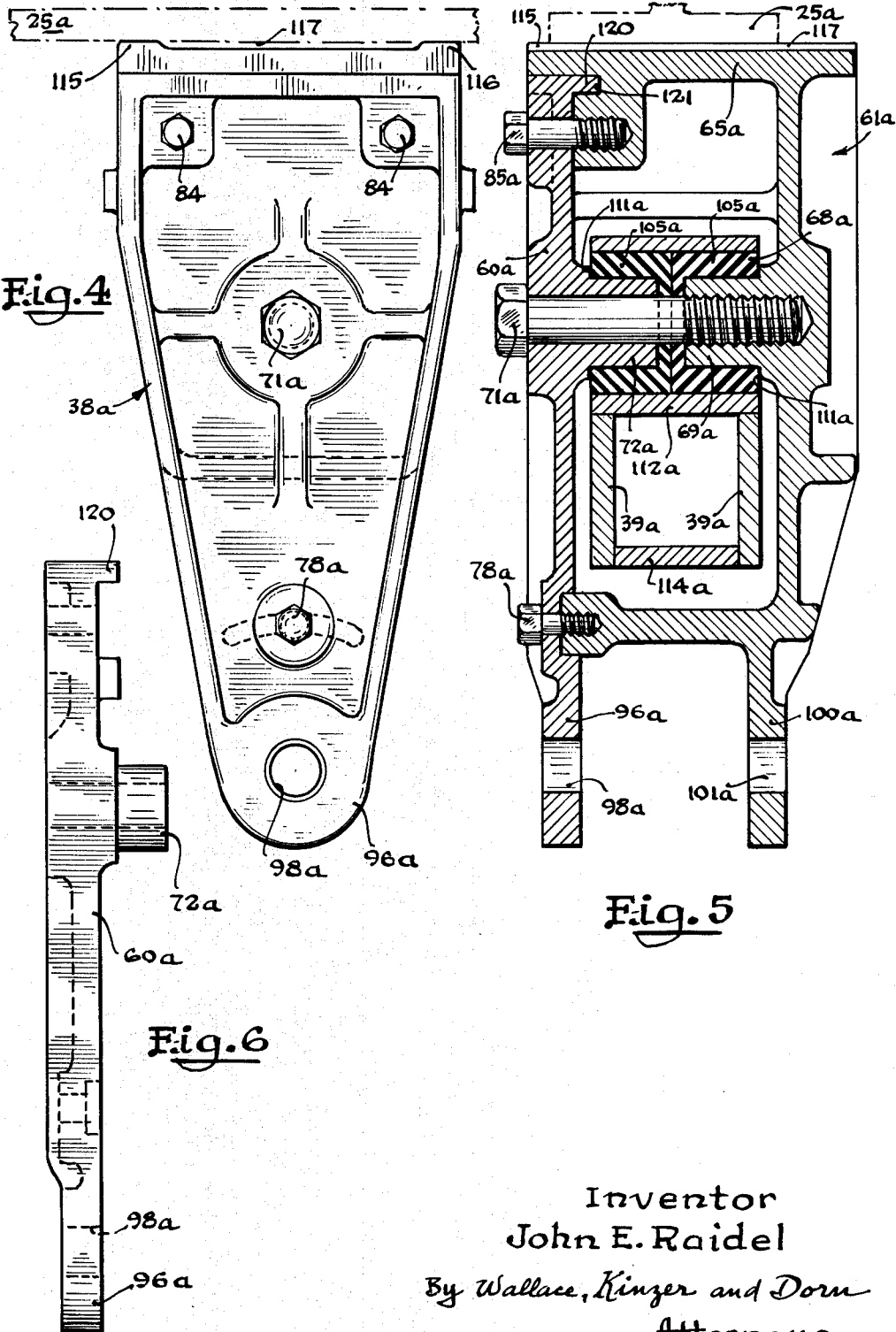

United States Patent Office 3,227,468
Patented Jan. 4, 1966

3,227,468
TANDEM SUSPENSIONS
John E. Raidel, Springfield, Mo., assignor to A.J. Industries, Inc., Springfield, Mo., a corporation of West Virginia
Filed Nov. 1, 1963, Ser. No. 320,628
4 Claims. (Cl. 280—104.5)

This invention relates to a particular type of tandem suspension employed on heavy duty trailers and the like wherein the load is distributed by an equalizer between tandem axles that carry the wheels of the trailer.

Tractor-towed-trailers of the type employed to haul cargo long distances are frequently equipped with two axles at the rear end, and the axles are supported by a tandem suspension usually characterized by a pair of semi-elliptical springs with adjacent ends engaged with a pivotal equalizer arm or beam supported by the frame of the vehicle having the tandem suspension. The arrangement is such that the ends of the springs for the axles engage opposite ends of such an equalizer so that when a load engendered by an impact is impressed upon one axle and spring the equalizer is pivoted by this spring to distribute the load to the other spring associated with the equalizer.

Most commonly, the equalizer is supported for pivotal movement in an equalizer housing or bracket in the form of a unitary one-piece casting. This casting usually houses resilient support bushings for the equalizer shaft. A typical one-piece equalizer supporting bracket, and equalizer support shaft arrangement is shown in Patent No. 2,853,325.

While such conventional equalizer support brackets have proven eminently satisfactory in use, an object of the present invention is to develop a simplified supported assembly for an equalizer characterized by relatively few elements and an assembly which is more easily assembled and maintained in comparison to the conventional supports.

The one-piece equalizer supporting brackets as heretofore constructed encloses the equalizer beams in a cavity in an integral casting so that the assembly or disassembly of the shaft and bushings is most difficult either in constructing or in repairing, particularly on the road where tools and facilities are limited. Additionally, inspection of the equalizer beam, its supporting shaft, and bushings are difficult when they are in the interior of a one-piece casting. Hence, another object of the present invention is to facilitate the inspection, assembly or repair of the equalizer beam and its supporting bushings in a bracket by affording an equalizer bracket of separate and detachable portions, which can readily expose the equalizer beam and bushings for inspection, servicing and repair.

In accordance with other objects of the invention resilient bushings, of the split cup type directly support the equalizer beam and are carried by inwardly directed portions of the equalizer hanger bracket and are so arranged that when the bracket is fastened together shoulders on the bracket serve to compress the internal bushings to grip the equalizer beam and thereby subject the internal bushings to a torque stress engendered by rotation of the equalizer beam.

A further object of the invention is an equalizer hanger bracket constructed of a two-piece construction, but of such rugged construction that the separate portions of the bracket are able to bear up under the forces encountered and still retain a positive and aligned relationship with one another.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is an enlarged front elevational view of a first embodiment of the equalizer supporting bracket constructed under the present invention;

FIG. 3 is a sectional view showing the equalizer supporting bracket of FIG. 2;

FIG. 4 is a front elevational view of another embodiment of the present invention showing an equalizer supporting bracket;

FIG. 5 is a sectional view showing the equalizer supporting bracket of FIG. 4; and FIG. 6 is a side view of one-piece and independent portion of the assembled equalizer hanger bracket of FIG. 5.

Figure 1:
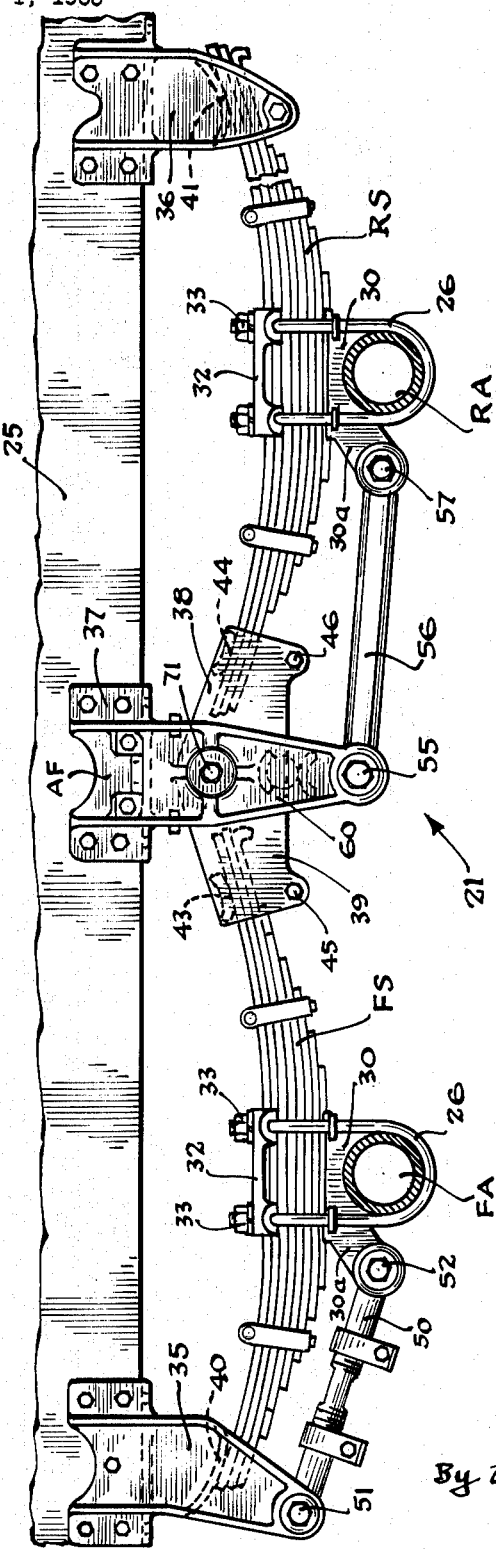
FIG. 1 is a side elevational view of a tandem suspension in which the present invention may be advantageously embodied.

For purposes of disclosure, the invention is herein illustrated as embodied on a frame 25 of a heavy duty trailer, the rear end of which is supported by a tandem 21. The tandem 21 embodies a front axle FA and a rear axle RA that are related to the frame 25 by equalized spring means of the semi-elliptical type, namely, a semi-elliptic front spring FS and a semi-elliptic rear spring RS.

While only one side member of the frame 25 has been shown, it is to be understood that on the opposite side of the truck there is embodied a substantially similar side member of the frame 25 and that the other side member supports semi-elliptical springs and the opposite ends of the axles FA and RA.

While not shown, wheels are normally rotatably mounted on each end of the front axle FA, and each end of the rear axle RA. The semi-elliptical springs FS and RS, respectively, are fixedly secured to their respective axles FA and RA by means of U bolts 26 extending between an upper clamping plate 32 and a lower axle seat plate 30. The axle seats or arms 30 include forwardly projecting parts 30a serving a purpose hereinafter described. The U bolts 26 extend upwardly through openings in the upper clamping plates 32 and have fastening nuts 33 tightened on their upstanding threaded ends in order to clamp the axles to the springs.

In relating the front and rear springs FS and RS to the vehicle frame 25, an equalizing means is afforded, and as herein shown, this equalizing means is disposed between the adjacent ends of the springs FS and RS as hereinafter explained. For the purposes of supporting the front portion of the spring FS, a front hanger bracket 35 is fixed in a depending relation to the frame 25 to receive the front end of a front spring FS in the conventional manner. Similarly, a rear hanger bracket 36 is fixed in a depending relation on the frame 25 to receive the rear end of a rear spring RS in the conventional manner. Intermediate the hangers 35 and 36, an equalizer hanger bracket 37 is secured to the frame 25 so that a rocking equalizer beam 38 may engage the adjacent ends of the front and rear springs FS and RS in a conventional equalizing relation. While not shown, it is to be understood that the front hanger on the opposite side of the frame 25 and aligned with the front hanger 35 is connected thereto by a transverse brace rod and that the opposed equalized hanger brackets are likewise interconnected by a transverse brace rod as are the rear hanger brackets 36, all according to the usual practice.

The front hanger bracket 35 includes a downwardly directed arcuate bearing surface 40 against which the forward end of the spring FS is adapted to bear. A similar arcuate surface 41 is provided in the rear hanger bracket 36 and engages the rear spring RS near the end thereof.

The equalizer beam 38 has a pair of opposed arcuately shaped bearing plates 43 and 44, respectively, for engaging the adjacent ends of the springs FS and RS, respectively. Normally, the adjacent ends of the springs FS and RS bear against the bearing plates 43 and 44, but in the course of operation it sometimes occurs that the adjacent ends of the springs move downwardly to contact sleeved bolts 45 and 46, which serve to limit the displacement of the adjacent ends of the spring from the equalizer 38.

In addition to the spring connections between the axles FA and RA to the brackets 35, 36 and 37, the axles FA and RA and their respective axle holders 30 are connected by torque arms 50 and 56 to the brackets 35 and 37, respectively. The front torque arm 50 at the forward end thereof is pivotally connected to the front hanger bracket 35, and the rear end thereof is pivotally connected to the free end of projection 30a of the forward one of the axle seats 30, by adjustable torque joints 51 and 52, respectively, of any conventional form. Likewise, the rear torque arm 56 is pivotally connected to the equalizer bracket 37 and the rear one of the axle seats 30 by adjustable torque joints 55 and 57, respectively.

In the conventional manner, the equalizer beam 38 can be rotated by either one of the springs FS or RS to transfer a portion of an impressed load to the other of the springs, and thereby to its supported axle, so that no single axle and set of wheels supports the entire weight of the truck, even though one of the wheels may have hit a bump and be raised relative to the other wheels. The above described tandem suspension 22 of FIG. 1 is a conventional suspension that forms the environmental setting for the novel equalizer brackets shown in FIGS. 2–6, inclusive.

The equalizer bracket 37 shown in FIGS. 2 and 3 is characterized by two separate independent cast portions or members 60 and 61 which are so configured as to be joined together and secured together by fasteners to function as a unitary supporting bracket 37. As best seen in FIG. 3, the portion 61 is the larger portion of the assembled equalizer supporting bracket 37, and has a vertically upstanding attaching flange AF, which is apertured with four spaced openings 63, whereby the equalizer 37 can be bolted to the frame 25, FIG. 1. Therefore, the portion 61 of the equalizer bracket 37 is hereinafter referred to as the attaching portion of the equalizer bracket 37.

Extending normal to the flange AF of the attaching portion 61 is a top wall 65, which joins an integrally formed and downwardly extending side wall 66. The side wall 66 has at approximately the medial portion thereof an inwardly directed projection or boss with a tapped hole 70 therein for receiving the threaded end of a bolt-type fastener 71 adapted to be extended through an aligned opening in a matching projection or boss 72 on the other portion 60 of the hanger bracket 37. The attaching portion 61 has a transversely extending bottom wall 75 which has an enlarged tapped boss 76 adapted to receive a bolt-type fastener 78 extending through an aligned opening 80 in the other portion 60 of the hanger bracket 37.

As should be apparent from FIGS. 2 and 3, the other portion 60 of the hanger bracket 37 is the lesser or smaller of the two portions in that it does not have an attaching flange, an extensive top wall or a bottom wall such as on the attaching portion 61. The other or second portion 60 of the bracket 37 has a pair of upstanding vertical ears 83 (FIG. 2), which have aligned openings 84 therein, through which bolt-type fasteners 85 are inserted for threading in aligned tapped holes 86 in the attaching portion 61 of the equalizer hanger bracket 37. The attaching portion 61 as laterally extending upper shoulders 88 which mate with the upstanding ears 83, and the other portion 60 has a lower, laterally extending flange 89 extending into a suitable recess 90 therefor on the attaching portion 61 of the bracket 37. Thus, it is seen that these upper parts of the attaching and other portion of the equalizer bracket 37 fit within one another in a complementary-like manner, with the inner ends of the wall means 65 and 75 bearing against inside faces of the other portion 60 of the bracket assembly and thus present the appearance of a unified one-piece cast bracket.

Extending the full length of the bracket 37 and along the outer border thereof are strengthening ribs, the attaching portion 61 having upper ribs 94 vertically aligned with strengthening ribs 95 on the other portion 60. The strengthening ribs 95 extend vertically downwardly and then converge inwardly and terminate at a lower circular boss 96 which has chamfered opening 98 therein. On the reverse side of the attaching portion 61, that is, the far side of the bracket 37 shown in FIG. 2, similar strengthening ribs 99 extend downwardly along the outer edge thereof and converge at the same angle as the ribs 95 to a lower boss 100 having a chamfered opening 101, FIG. 3, therein. The opening 101 is aligned with the chamfered opening 98 in the boss 96 on the first portion 60 when the portions 60 and 61 are properly secured together to constitute a unitary bracket 37. The chamfered openings 98 and 101 are adapted to receive the torque arm joint 57 (FIG. 1) for pivotally mounting the torque arm 56 for rotational movement in the space between the bosses 96 and 100.

For the purpose of rotatably supporting the equalizer beam 38 without requiring a separate equalizer shaft and related parts, the equalizer bracket 37 of the present invention has the interior projections 69 and 72 on the portions 60 and 61 so arranged as to constitute a support or axle for the equalizer beam 38. Each of the projections 69 and 72, is adapted to receive telescopically a cup-shaped bearing or bushing 105, which is inserted over the respective projections 69 and 72. The bushings 105 are preferably made of a flexible or rubber material although other suitable materials could be employed.

The bushings 105 have annular end walls 106 abutted at an interface 108 and have outwardly extending cylindrical portions abutting at their outer ends 110 against the annular shoulders 111 provided on each of the projections 69 and 72, respectively.

The resilient bushings 105 support a central sleeve 112 of the equalizer beam 38, which has an interior bore, the diameter of which closely approximates the exterior diameter of the rubber bushings 105 when they are in their relaxed or non-compressed state. The bushings 105 are compressed by turning the threaded bolt 71 to bring the shoulders 111 on the respectively opposed interior bosses 69 and 72 closer together. Since the bushings 105 are tightly gripping the equalizer beam 38, a rocking of the equalizer beam 38 exerts an interior twisting of the bushings 105 which twisting resists the turning of the beam 38. To vary the gripping force of the bushings, slightly different sizes of bushings can be employed as well as different materials as the bushing material.

The collar 112 of the equalizer beam 38 is joined in a suitable manner, such as welding, to the side plates 39 of the equalizer beam 38. As shown in FIG. 3, the side walls 39 of the equalizer beam 38 are joined together at their lower ends by a bracing bar 114. Thus, the equalizing beam 38 is a unitary, rigidly constructed, and monolithic structure which can withstand and transfer the loads impressed thereon by springs FS and RS.

Rubber bushings have heretofore been employed for resisting the oscillation of an equalizer beam by being placed in shear as the equalizer beam rotates, for instance, the bushings 60 and 61 of the aforementioned patent. However, in the aforementioned patent, the bushings were placed within exteriorly extending bosses included as a part of the equalizer support bracket, and served to grip an equalizer supporting shaft or axle to control movement thereof, the shaft being secured by suitable fasteners to a collar on the equalizer beam. Departing from such an arrangement of elements, the present invention enables a pair of simple cup shaped bushings 105 to be used in supporting the collar 112 of the equalizer beam 38 for pivotal movement, thus eliminating a separate shaft, related fasteners, and specially formed exteriorly extending bosses. With the one-piece equalizer hanger bracket, as heretobefore used, access to the interior of the bracket, as for servicing or inspection of the bushings, shaft, or equalizer beam, required a complete disassembly operation, but with the present device, the fasteners 71, 78 and 85 can be loosened and the second portion 60 can be removed without detaching the attaching portion 61 the hanger bracket 38 from the frame 25, and hence the bushings and equalizer can be easily inspected and serviced. Additionally, the installation of an equalizer beam 38 is facilitated by the present device since the attaching flange AF can be secured to the frame 25 and the collar 112 of the equalizer beam 38 placed on the projection 69 and the bushing 105 prior to the insertion of the opposed bushing 105 and projection 72.

Another embodiment of the present invention is shown in FIGS. 4–6 inclusive, and has common elements with the embodiment shown, the common elements being FIGS. 2 and 3 designated by a suffix $a$. For example, the attaching portion 61$a$ of the equalizer bracket 38 has an upper wall 65$a$ extending completely across the top of the equalizer bracket 38$a$. The upper wall 65$a$ is provided with upwardly extending end portions 115 and 116 abutted against the bottom surface 117 of the running gear frame 25$a$. The slight recesses formed between the end portions 115 and 116 and the surface 117 of the frame 25$a$ are provided to facilitate the welding of the bracket 38$a$ to the running gear frame 25$a$. Thus, the bracket 38$a$ is adapted to be welded to the frame rather than being secured thereto by an attaching flange AF and fasteners as in the embodiment shown in the FIG. 3.

The portion 60$a$ of the equalizer bracket 30$a$ is better supported against downward forces than its counterpart portion 60 of the equalizer bracket 38 in that it has an inwardly directed ledge 120 at its upper end adapted to be inserted in a complementary shaped recess 121 in the attaching portion 61$a$. Thus, the ledge 120 constitutes an abutment resisting downward forces that would tend to slip or slide the portion 60$a$ past the portion 61$a$, and thereby tend to shift or misalign the bushings 105$a$ carried on the matching projections 72$a$ and 69$a$.

The equalizer bracket 38$a$ is otherwise similar to the equalizer bracket 38 of FIGURES 2 and 3, in that it has upper and lower walls on the portion 61$a$ with ends bearing against the inside face of the portion 60$a$, and fasteners 71$a$, 78$a$ and 85$a$ for securing the portions 61$a$ and 60$a$ together to form a unitary equalizer bracket. Also, the shoulders 111$a$ and projections 69$a$ and 72$a$ serve to compress the bushings 105$a$ and help to resist the oscillation of the collar 112 of the equalizer beam 38.

From the foregoing, it should be apparent that the equalizer bracket assembly 37 having the cup shaped bushings on interior coaxial projections or bosses constitutes a simplified mounting arrangment for the equalizer beam. Also it is apparent that the equalizer bracket is ruggedly constructed of two parts or portions, one of which can be easily removed to permit the ready inspection and maintenance of the bushings and/or equalizer beam.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. In a tandem suspension for truck trailers or the like having a pair of axles for supporting the wheels of said truck trailers, a pair of semi-elliptical springs supporting said axles, supporting brackets for supporting one end of each of said semi-elliptical springs, frame means secured to said truck trailer and carrying said supporting brackets, an equalizer beam engaging the adjacent ends of said semi-elliptical springs and rotatable by either of said springs about an axis of rotation to transfer a portion of the load from one spring to the opposite spring, the improvement comprising an equalizer supporting bracket for supporting said equalizer beam for rotational movement, said equalizer supporting bracket comprising a first independent and separable portion secured to said frame, a second independent and separable portion secured to said first independent portion and cooperating with said first independent portion to support said equalizer beam for rotational movement, aligned openings in said first and second portions for receiving fastening means for assembling said first and second portions together, and aligned, interiorly projecting bosses on each of said portions, each of said bosses being integral with its respective portion and being aligned with each other and extending toward each other to constitute a shaft means, each of said bosses having an aligned opening therein, split bushing means disposed on said shaft means afforded by said projecting bosses, and fastener means in said openings for compression said bushing means.

2. In a tandem suspension for truck trailers or the like having a pair of axles for supporting the wheels of said truck trailers, a pair of semi-elliptical springs supporting said axles, supporting brackets for supporting one end of each of said semi-elliptical springs, frame means secured to said truck trailer and carrying said supporting brackets, an equalizer beam engaging the adjacent ends of said semi-elliptical springs and rotatable by either of said springs about an axis of rotation to transfer a portion of the load from one spring to the opposite spring, the improvement comprising an equalizer supporting bracket for supporting said equalizer beam for rotational movement, said equalizer supporting bracket comprising a first independent and separable portion secured to said frame, a second independent and separable portion adapted to be secured to said first independent portion and cooperating therewith to support said equalizer beam for rotational movement, opposed interfitting means on said first and second portions adapted to be mated together, opposed inwardly directed projections on each of said portions constituting axles about which said equalizer beam is to rotate, a pair of resilient cup-shaped bushings each mounted on axle projections, said bushings serving as bearings for the equalizer beams positioned on said bushings, and having inner faces abutted together and means on said first and second portions for compressing said resilient bearing means to force the resilient bearings to grip the equalizer and thereby resist the oscillation of the equalizer beam about the opposed projections.

3. In an equalizer supporting means for supporting an equalizer beam for rotational movement, a bracket means having two independent and separable portions capable of being assembled together to form a bracket; fastening means extending through aligned openings in said two portions and serving to join said two portions together; opposed interiorly directed projections on each of said two portions; bearing means suported by said projections and adapted to support said equalizer for rotation about said opposed projections of said bracket, said bearing means including a pair of resilient cup shaped bushings mounted on each of said opposed projections and being abutted together, each of said independent portions of said bracket having shoulders thereon in engagement with said resilient bearings so that tightening of the fastening means causes the shoulders to move inwardly to compress the resilient bearings to bind against the equalizer beam pivotally mounted thereon.

4. An equalizer supporting bracket for mounting an equalizer beam of a tandem suspension to a frame of a truck trailer or the like, said equalizer supporting bracket comprising: a first independent and separable portion adapted to be secured to said frame; a second and separable portion cooperable with said first portion to constitute said supporting bracket, said second portion secured only to said first portion and removable therefrom while said first portion remains attached to said frame, upper and lower wall means extending between said first and second portions, each of said wall means being integral with a related one of said portions and having an end engageable with the inside face of the other of said portions in assembled relationship to afford a rigid assembly; one of said portions being formed on the inside thereof with tapped openings for the threaded ends of fastener bolts for securing said portions in assembled relationship and the other of said portions being formed with openings for receiving the shanks of said bolts; and a support boss rigid with the inner face of each of said portions and projecting toward one another in a coaxial relationship and disposed between said upper and lower wall means for supporting a bushing for the equalizer beam.

References Cited by the Examiner
UNITED STATES PATENTS

| | | | |
|---|---|---|---|
| 2,754,132 | 7/1956 | Martin | 280—104.5 |
| 2,880,991 | 7/1956 | Ward | 280—104.5 |
| 3,074,738 | 1/1963 | Ward | 280—104.5 |

BENJAMIN HERSH, *Primary Examiner.*

A. HARRY LEVY, MILTON BUCHLER, *Examiners.*